(12) United States Patent
Hasegawa et al.

(10) Patent No.: US 10,075,092 B2
(45) Date of Patent: Sep. 11, 2018

(54) NEUTRAL POINT POWER CONVERTER WITH FIRST AND SECOND CHOPPER CELL GROUPS

(71) Applicant: KABUSHIKI KAISHA TOSHIBA, Minato-ku (JP)

(72) Inventors: Ryuta Hasegawa, Hino (JP); Yosuke Nakazawa, Kunitachi (JP); Daichi Suzuki, Fuchu (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/114,106

(22) PCT Filed: Jan. 29, 2015

(86) PCT No.: PCT/JP2015/052499
§ 371 (c)(1),
(2) Date: Jul. 26, 2016

(87) PCT Pub. No.: WO2015/115535
PCT Pub. Date: Aug. 6, 2015

(65) Prior Publication Data
US 2017/0005590 A1 Jan. 5, 2017

(30) Foreign Application Priority Data
Feb. 3, 2014 (JP) ................. 2014-018703

(51) Int. Cl.
*H02M 7/487* (2007.01)
*H02M 1/00* (2006.01)
*H02M 7/483* (2007.01)

(52) U.S. Cl.
CPC .... *H02M 7/487* (2013.01); *H02M 2001/0003* (2013.01); *H02M 2001/0064* (2013.01); *H02M 2007/4835* (2013.01)

(58) Field of Classification Search
CPC ......... H02M 2007/4835; H02M 7/487; H02M 2001/0064
See application file for complete search history.

(56) References Cited

U.S. PATENT DOCUMENTS 6,392,907 B1 * 5/2002 Ichikawa ............. H02M 7/487
363/132
8,233,300 B2 7/2012 Dommaschk et al.
(Continued)

FOREIGN PATENT DOCUMENTS

CN 1101464 A 4/1995
CN 102237672 A 11/2011
(Continued)

OTHER PUBLICATIONS

Ryuta Hasegawa, et al., "Neutral Point Clamped Modular Multi-level Converter," 2014 IEE—Japan Industry Applications Society Conference, Aug. 2014, 7 pages (with English abstract).
(Continued)

Primary Examiner — Harry Behm
(74) Attorney, Agent, or Firm — Oblon, McClelland, Maier & Neustadt, L.L.P.

(57) ABSTRACT

In a power converter a DC positive terminal of a DC power supply is connected to a switching element, the DC negative terminal of the DC power supply is connected to a switching element. A capacitor and a capacitor connected in series are connected in parallel with the DC power supply, and a DC neutral point divided by the capacitor and the capacitor is connected to a switching element and a switching element. The switching element is connected to the positive terminal of a chopper cell group circuit, and the switching element is connected to the negative terminal of a chopper cell group circuit. The negative terminal of the chopper cell group circuit is connected to the positive terminal of the chopper (Continued)

cell group circuit, and the connection node therebetween serves as an output AC terminal.

9 Claims, 8 Drawing Sheets

(56) References Cited

U.S. PATENT DOCUMENTS

| | | | |
|---|---|---|---|
| 8,390,259 | B2 | 3/2013 | Dommaschk et al. |
| 9,042,142 | B2 | 5/2015 | Guan et al. |
| 9,369,065 | B2 * | 6/2016 | Nakazawa ............ H02M 7/537 |
| 2013/0249322 | A1 | 9/2013 | Zhang et al. |
| 2014/0092660 | A1 | 4/2014 | Zhang et al. |
| 2014/0092661 | A1 | 4/2014 | Zhang et al. |
| 2015/0062991 | A1 * | 3/2015 | Zhang .................. H02M 7/487 |
| | | | 363/131 |
| 2015/0236611 | A1 * | 8/2015 | Nakazawa ............. H02M 7/06 |
| | | | 363/123 |
| 2016/0141969 | A1 * | 5/2016 | Trainer .................... H02J 3/02 |
| | | | 363/37 |

FOREIGN PATENT DOCUMENTS

| | | |
|---|---|---|
| CN | 103715931 A | 4/2014 |
| EP | 2 713 495 A2 | 4/2014 |
| JP | 2006-87257 A | 3/2006 |
| JP | 2010-512134 A | 4/2010 |
| JP | 2010-517496 A | 5/2010 |
| JP | 2013-99054 A | 5/2013 |
| JP | 2013-533729 A | 8/2013 |

OTHER PUBLICATIONS

International Search Report dated Apr. 28, 2015 in PCT/JP2015/052499 Filed Jan. 29, 2015.

G.P. Adam, et al., "New Flying Capacitor Multilevel Converter" 2011 IEEE International Symposium on Industrial Electronics (ISIE). XP032019090, 2011, pp. 335-339.

* cited by examiner

US 10,075,092 B2

NEUTRAL POINT POWER CONVERTER WITH FIRST AND SECOND CHOPPER CELL GROUPS

CROSS-REFERENCE TO RELATED APPLICATIONS

This application is based upon PCT filing PCT/JP2015/052499 filed Jan. 29, 2015, and claims a priority of Japanese Patent Application No. 2014-018703, filed on Feb. 3, 2014, the contents of each of which being incorporated herein by reference.

TECHNICAL FIELD

Embodiments of the present disclosure relate to a power converter that mutually converts power between AC and DC.

BACKGROUND ART

In recent years, popularization of renewable energies, such as wind power generation, solar light power generation, and solar heat power generation, is accelerated, and in order to cover a further large amount of demanded power by renewable energies, examinations on wind power generation on the ocean, and solar light and solar heat power generations at desert regions have begun. In the case of the wind power generation on the ocean, it is necessary to, for example, transmit a large amount of generated power to cities where the power is to be consumed via undersea cables, and to highly efficiently transmit a large amount of power from a closed-off desert regions in Africa or China to Europe and a large city in a coastal area. As for such needs, a DC power transmission is highly efficient in comparison with a conventional three-phase AC power transmission, and thus examination on an establishment of a DC power transmission network has begun since such a network can be installed with suppressing costs.

In the case of DC power transmission, power converters are needed, such as a converter that converts a generated AC power into a DC power for DC power transmission, and an inverter that converts the transmitted DC power into an AC power for a city. Recently, a Modular Multilevel Converter (MMC) is already in practical use, MMC is capable of outputting a voltage waveform resembling a sine wave so as not to cause harmonic originating from the switching operations by the converter and inverter to flow to the AC system, and is capable of reducing the number of output filters.

FIG. 10 is a circuit diagram illustrating a unit block that forms a conventional MMC.

A chipper cell C that is a unit block has a leg 1 and a capacitor (c_ch) 2 connected in parallel. The leg 1 includes two switching element (sw_ch1) 3a and switching element (sw_ch2) 3b connected in series.

FIG. 11 illustrates an example MMC utilized for a conventional DC power transmission application. An MMC 50 has a U-phase leg 51, V-phase leg 52, and a W-phase leg 53 connected in parallel and to a DC power supply 54. Each leg is connected to a three-phase transformer (tr) 55, and this three-phase transformer (tr) 55 is connected to a power system (V_S) 56. Each leg includes the above-explained 12 chopper cells C connected in series. In addition, provided at the center of the U-phase leg 51 are a reactor (lb_up) 57a and a reactor (lb_un) 57b, provided at the center of the V-phase leg 52 are a reactor (lb_vp) 58a and a reactor (lb_vn) 58b, and, provided at the center of the W-phase leg 53 are a reactor (lb_wp) 59a and a reactor (lb_wn) 59b.

As for the operation of this MMC 50, an explanation will be given of the U-phase leg 51 as an example. A total voltage v_up of positive chopper cells ch_up 1 to 6 is subtracted from an input DC voltage V_dc of the DC power supply 54, and a total voltage v_un of negative chopper cells ch_un 1 to 6 is added with reference to a reference voltage, and thus an AC voltage is obtained. In addition, this AC voltage is converted into a desired AC voltage by the three-phase transformer (tr) 55. Still further, the reactor (lb_up) 57a and the reactor (lb_un) 57b suppress an increase in current due to a short-circuit between the input DC voltage v_dc and a chopper cell output voltage v_up+v_un. The same is true of the V-phase leg 52 and the W-phase leg 53. A three-phase AC voltage is generated through the above-explained operation.

CITATION LIST

Patent Document

Patent Document 1: JP 2010-512134 A

According to this MMC 50, however, since a power pulsation equivalent to the AC frequency of the output appears in principle on the capacitor of the chopper cell C, in order to control the variability of the capacitor voltage to a constant value, it is necessary to increase the capacity of the capacitor. In the case of DC power transmission that has a DC voltage up to several ten kV to several hundred kV, when the number of chopper cells increases, the capacitor dimension increases in proportional thereto, and thus the dimension of the MMC 50 also increases.

In addition, the AC current to be output is a reactive current from the standpoint of the input DC voltage. Hence, in order to exchange the power between the DC voltage and the AC voltage, it is necessary to cause the DC current equivalent to the input-output power to flow through the chopper cell C. Hence, the current that flows through the switching element (sw_ch1) 3a and the switching element (sw_ch2) both forming the chopper cell C increases, and thus the power conversion loss also increases.

An objective of the embodiments of the present disclosure is to provide a power converter which has a function of outputting AC voltage and current equivalent to those of the MMC, and which is also capable of reducing a dimension and a power conversion loss.

SUMMARY

In order to accomplish the above objective, a power converter according to an embodiment of the present disclosure mutually converts power between AC and DC, and the power converter includes:

first, second, third, and fourth switching elements having self-extinguishing properties and connected in series to a DC power supply in an ascending order, a collector of the first switching element being connected to a DC positive terminal of the DC power supply, an emitter of the fourth switching element being connected to a DC negative terminal of the DC power supply;

first and second capacitors connected with each other in series and connected in parallel with the DC power supply, a DC neutral point divided by the first and second capacitors being connected to an emitter of the second switching element and a collector of the third switching element; and first and second chopper cell group circuits each comprising one or more chopper cells connected in series that comprise a leg having two self-extinguishing type switching elements connected in series, and a capacitor connected to the leg in parallel therewith;

in which:

the second switching element has a collector connected to a positive terminal of the first chopper cell group circuit;

the third switching element has an emitter connected to a negative terminal of the second chopper cell group circuit; and the first chopper cell group circuit has a negative terminal connected to a positive terminal of the second chopper cell, a connection node therebetween serving as an output AC terminal.

DETAILED DESCRIPTION

Embodiments of the present disclosure will be explained below in detail with reference to the accompanying figures.

First Embodiment

Entire Structure

Figure 1:
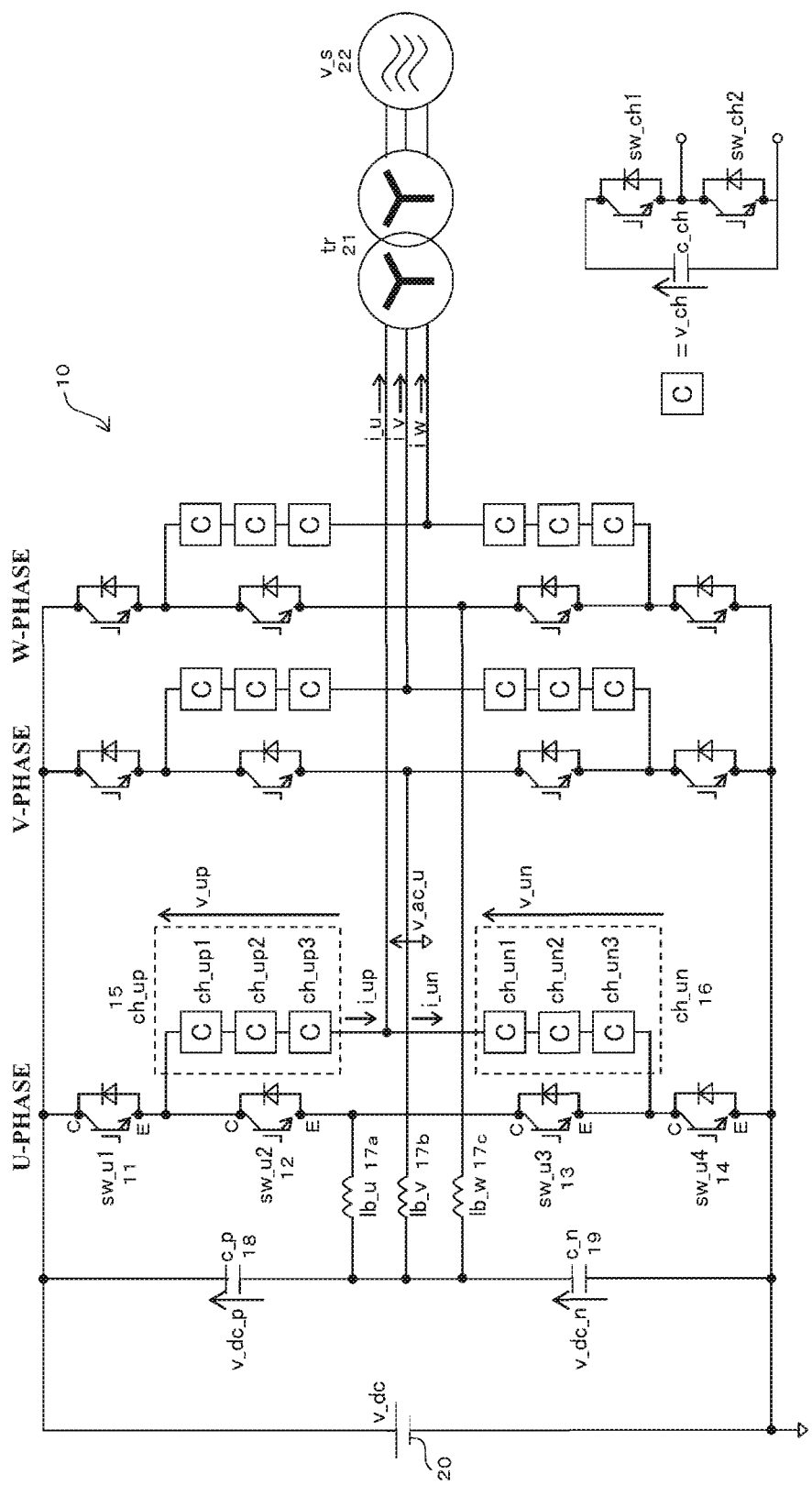
FIG. 1 is a circuit diagram illustrating a power converter according to a first embodiment of the present disclosure.

FIG. 1 is a circuit diagram of a power converter according to a first embodiment of the present disclosure.

An explanation will be given of the structure of this power converter 10 for the U-phase as an example. The power converter for the U-phase includes a switching element (sw_u1) 11, a switching element (sw_u2) 12, a switching element (sw_u3) 13, a switching element (sw_u4) 14, a chopper cell group circuit (ch_up) 15, a chopper cell group circuit (ch_un) 16, a reactor (lb_u) 17a, a capacitor (c_p) 18, a capacitor (c_n) 19, and a DC power supply 20.

This power converter 10 converts an input DC voltage v_dc from the DC power supply 20 into a three-phase AC voltage v_ac, and outputs an AC power to a power-system voltage (v_s) 22 through a transformer (tr) 21. Note that in this embodiment, a negative terminal of the input DC voltage v_dc is designed as a reference potential.

(Switching Elements 11-14)

The switching elements 11-14 have respective withstand voltages determined based on the input DC voltage v_dc from the DC power supply 20. An element to be applied is determined based on the input DC voltage v_dc, considering a superimposed surging voltage on the voltage v_dc/2. When the DC voltage is above several ten kV, it becomes difficult to accomplish a sufficient withstand voltage by a single element, and thus it is necessary to connect a plurality of elements in series. The switching elements 11-14 are each a self-extinguishing type element, such as an Insulated Gate Bipolar Transistor (IGBT) or a Metal-Oxide-Semiconductor Field-Effect Transistor (MOSFET). For example, the respective switching elements 11-14 are IGBTs connected in series.

The switching elements 11-14 are connected in series in the order of the switching element 11, the switching element 12, the switching element 13, and the switching element 14. In addition, the DC positive terminal of the DC power supply 20 is connected to the collector (c) of the switching element 11, and the DC negative terminal of the DC power supply 20 is connected to the emitter (E) of the switching element 14. Still further, connected to the DC neutral point divided by a capacitor 18 and a capacitor 19 are the emitter (E) of the switching element 12, and the collector (c) of the switching element 13 via the reactor 17a.

(Chopper Cell Group Circuits 15, 16)

Figure 10:
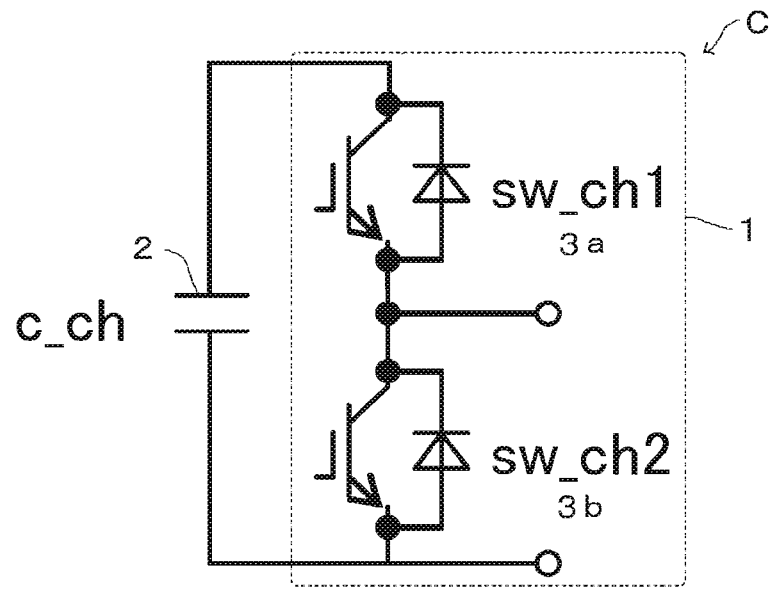
FIG. 10 is a circuit diagram illustrating a unit block that forms a conventional MMC.

The chopper cell group circuits 15, 16 each include a plurality of chopper cells C illustrated in FIG. 10 and connected in series. The number of chopper cells in the chopper cell group circuit 15 is determined based on the input DC voltage v_dc and a chopper cell capacitor voltage v_ch, and is substantially (v_dc/2)/v_ch. The same is true of the number of chopper cells in the chopper cell group circuit 16. In this embodiment, the number of chopper cells is designed as three.

In addition, the collector (C) of the switching element 12 is connected to the positive terminal of the chopper cell group circuit 15, and the emitter (E) of the switching element 13 is connected to the negative terminal of the chopper cell group circuit 16. Still further, the negative terminal of the chopper cell group circuit 15 is connected to the positive terminal of the chopper cell group circuit 16, and a connection node therebetween serves as an output AC voltage terminal.

(Reactor 17a)

When the power converter 10 is activated, and when the output AC voltage v_ac_u is positive, a voltage v_up+v_un obtained by totaling an output voltage v_up by the chopper cell group circuit 15 and an output voltage v_un by the chopper cell group circuit 16 is short-circuited to a voltage v_dc_p from the capacitor 18 through the switching elements 11, 13. In addition, when the output AC voltage v_ac_u is negative, v_up+v_un is short-circuited to a voltage v_dc_n from the capacitor 19 through the switching elements 12, 14.

In order to suppress a current increase at this time, the reactor 17a is inserted in, for example, a path from the connection node between the switching element 12 and the switching element 13 to the DC neutral point. In addition, the reactor 17a may be inserted in a path through the DC positive terminal, the switching element 11, the chopper cell group circuit 15, the output AC terminal, the chopper cell group circuit 16, the switching element 14, and the DC negative terminal. By inserting the reactor 17a in the path from the connection node between the switching element 12 and the switching element 13 to the DC neutral point, a function of suppressing a current generated when the switching element 11 and the switching element 12, or the switching element 13 and the switching element 14 are falsely short-circuited is also obtained.

Likewise the above explanation for the U-phase, the power converter for the V-phase and in the W-phase is also formed.

(Control Method)

Figure 2:
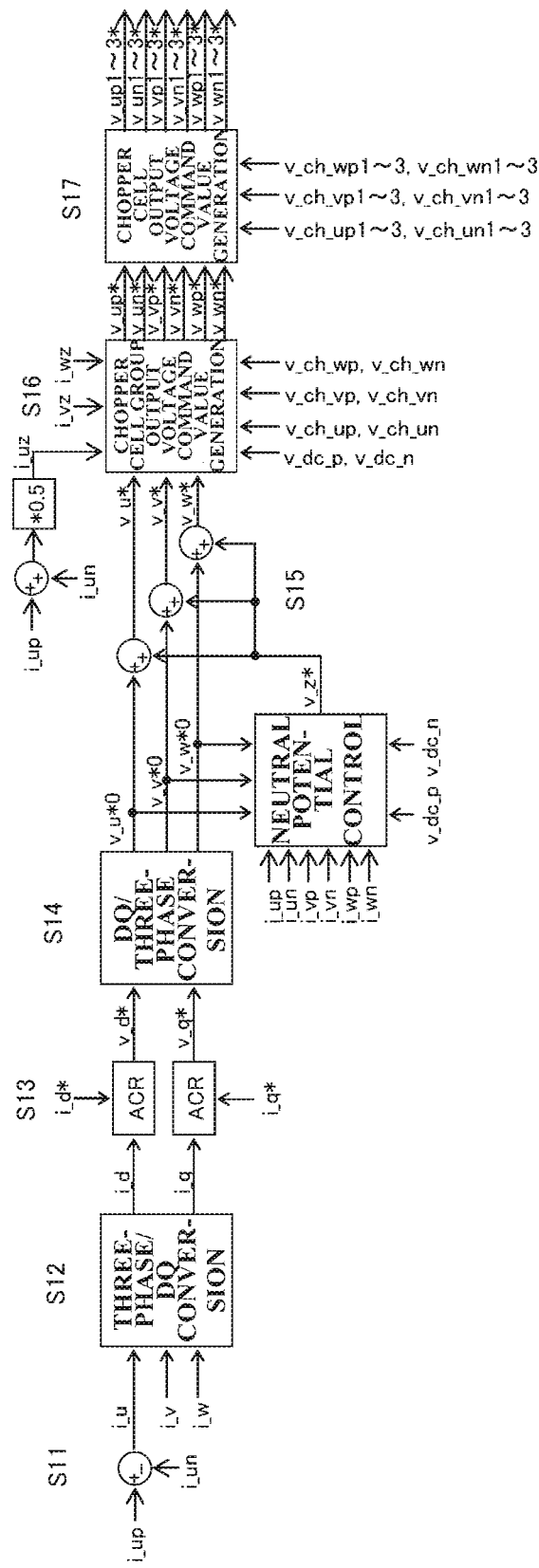
FIG. 2 is an entire control block diagram of the power converter according to the first embodiment.

Next, an explanation will be given of a control method of the power converter 10 according to this embodiment. FIG. 2 is an entire control block diagram of the power converter 10.

First, output AC currents i_u, i_v, and i_w in the respective phases are estimated. As an example, for the U-phase current i_u, a U-phase upper arm current i_up and a U-phase lower arm current i_un are respectively detected, and a calculation i_up−i_un=i_u is made, thereby estimating the U-phase current i_u (S11). Three-phase_DQ conversion is then performed on the estimated output AC currents i_u, i_v, and i_w, and a D-axis current i_d and a Q-axis current i_q are calculated (S12). API control so as to follow-up a D-axis current command value i_d* and a Q-axis current command value i_q* is performed, and a D-axis voltage command value v_d* and a Q-axis voltage command value v_q* are respectively calculated (S13). Next, DQ_three-phase conversion is performed to output voltage command values v_u*0, v_v*0, and v_w*0 in the respective phases (S14). In order to control the DC neutral point to constant, a zero-phase voltage command value v_z* is added in each phase (S15) to obtain three-phase AC voltage command values that are v_u*, v_v*, and v_w*. Since the same is true of the cases in the V-phase and in the W-phase, the following explanation will be given of the case in the U-phase as an example. A control of equalizing the respective capacitor voltages in the chopper cell group circuits 15, 16 is performed, and voltage command values v_up* and V_un* for the chopper cell group circuits 15, 16 are calculated (S16). Next, a control of equalizing the respective capacitor voltages in the chopper cells ch_up1-3, ch_un1-3 is performed, and voltage command values v_up1-3*, v_un1-3* for the respective chopper cells are calculated (S17).

Next, a method of controlling the neutral voltage to constant will be explained. According to the structures of two-phase and three-phase power converters, the current charged to and discharged from the capacitors 18, 19 is always the same, and thus the neutral voltage remains unchanged. However, since capacitors and switching elements have unique variability in leakage current, the charging-discharging current of the positive capacitor and that of the negative capacitor differs from each other in practice, and the neutral voltage is not maintained to exactly ½ of the input DC voltage. Hence, the same voltage is applied to the output AC voltages in the three phases. Since the AC output voltage is a line voltage between the output voltages in the respective phases, even if such a zero-phase voltage is applied, it does not affect the output AC voltage and the current.

Figure 3:
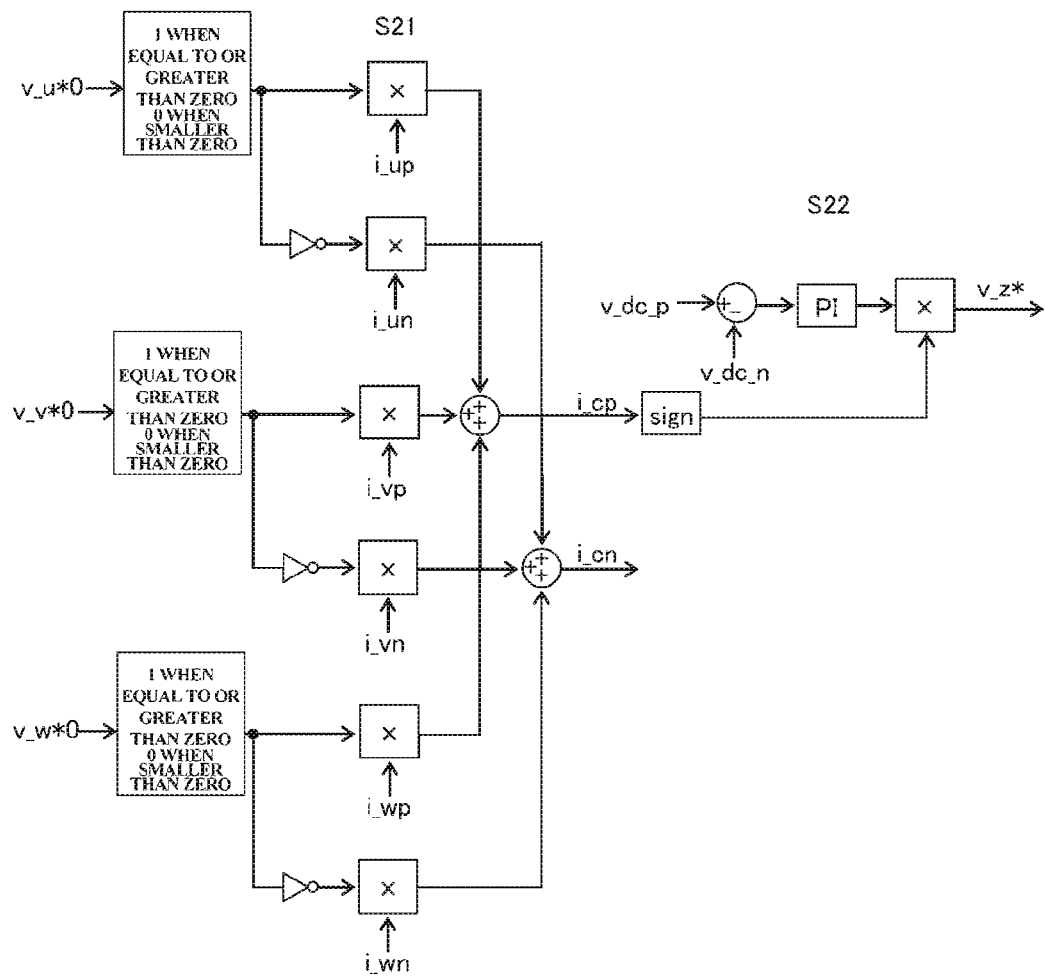
FIG. 3 is a neutral potential control block diagram illustrating a method of applying a zero-phase voltage.

First, a method of applying the zero-phase voltage will be explained with reference to FIG. 3 that is a neutral potential control block diagram. First, respective discharging currents from the capacitors 18, 19 which contribute to the variability in the neutral voltage are defined as i_cp, i_cn, respectively, and those are estimated. The discharging current from the capacitor 18 is consistent with a current when the output AC voltage is in the positive phase, and becomes zero when the output AC voltage is negative. The discharging current from the capacitor 19 is zero when the output AC voltage is positive, and is consistent with the current when the output AC voltage is in the negative phase. Hence, discharging currents i_cp, i_cn are calculated from the signs of the output voltage command values v_u*0, v_v*0, and V_w*0 in the respective phases which are positive or negative, and the output currents i_up, i_un, i_vp, i_vn, i_wp, and i_wn (S21). In the normal operation, since i_cp=i_cn, in this embodiment, a neutral potential control is performed using i_cp.

When the neutral voltage decreases, that is, when the capacitor voltage v_dc_n becomes smaller than the capacitor voltage v_dc_p, the zero-phase voltage command value v_z* is applied as follow. In this case, when i_cp is positive, the capacitors 18, 19 are discharged. Hence, in order to control the neutral voltage, it is necessary to cause the capacitor 18 to be discharged more. In order to extend the discharging time period for the capacitor 18, it is appropriate if a positive zero-phase voltage v_z* is applied. In this way, based on the increase or decrease in the neutral voltage and the positive or negative sign of the capacitor discharging current, the sign of the zero-phase voltage that is positive or negative is determined. In addition, the magnitude of the zero-phase voltage is also accomplished through a PI controller that causes a difference voltage v_dc_p−v_dc_n between the capacitor voltage v_dc_p and the capacitor voltage v_dc_n to be zero (S22).

In the case of the power converter with a structure for two phases, the neutral voltage can be controlled to constant through the similar control method. Note that in the case of a single-phase converter, when the output AC voltage is larger than the DC neutral voltage, a current is charged to and discharged from only the positive capacitor, and when the output AC voltage is smaller than the DC neutral voltage, the current is charged to and discharged from only the negative capacitor. Hence, the neutral potential varies for each half cycle of the output AC voltage.

Figure 4:
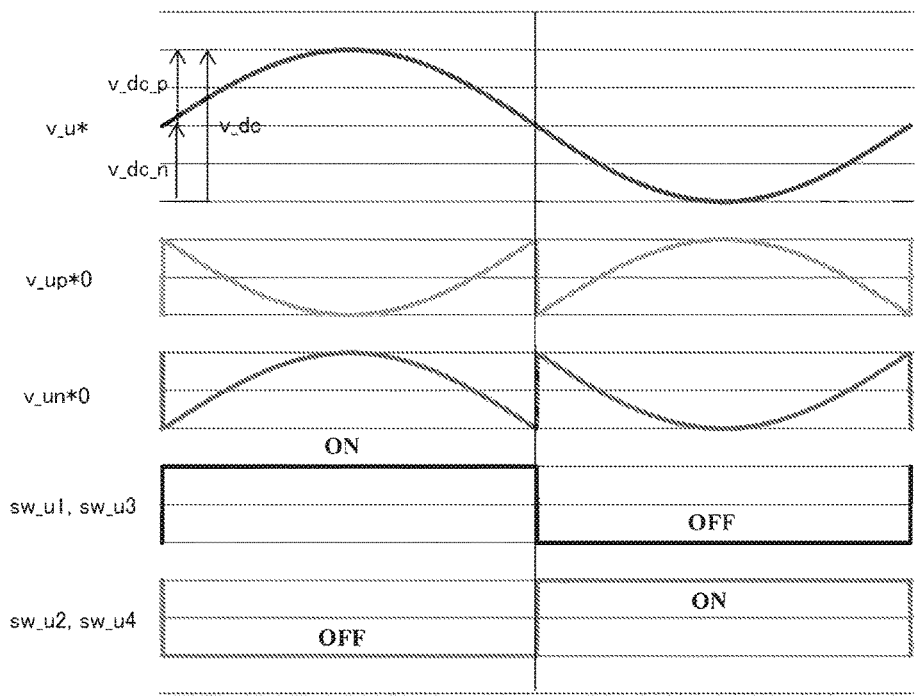
FIG. 4 is a graph illustrating a method of calculating a chopper cell group output voltage command value.

Next, a method of calculating the chopper cell group output voltage command value from the three-phase AC voltage command values v_u*, v_v*, and v_w* will be explained with reference to FIG. 4 for the U-phase as an example.

When the AC voltage command value v_u* is larger than the DC neutral voltage v_dc_n, the switching element (sw_u1) 11 and the switching element (sw_u3) 13 are turned ON, while the switching element (sw_u2) 12 and the switching element (sw_u4) 14 are turned OFF. The chopper cell group circuit (ch_up) 15 outputs a difference voltage between the DC voltage v_dc and the output AC voltage, while the chopper cell group circuit (ch_un) 16 outputs a difference voltage between the output AC voltage and the DC neutral point.

When the AC voltage command value v_u* is smaller than the DC neutral voltage v_dc_n, the switching element (sw_u1) 11 and the switching element (sw_u3) 13 are turned OFF, while the switching element (sw_u2) 12 and the switching element (sw_u4) 14 are turned ON. The chopper cell group circuit (ch_up) 15 outputs a difference voltage between the DC neutral voltage and the output AC voltage, and the chopper cell group circuit (ch_un) 16 outputs a difference voltage between the output AC voltage and the reference potential.

Figure 5:
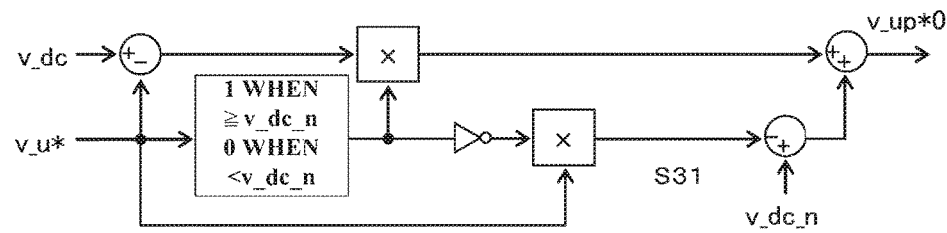
FIG. 5 is a control block diagram illustrating the method of calculating the chopper cell group output voltage command value.
Figure 5:
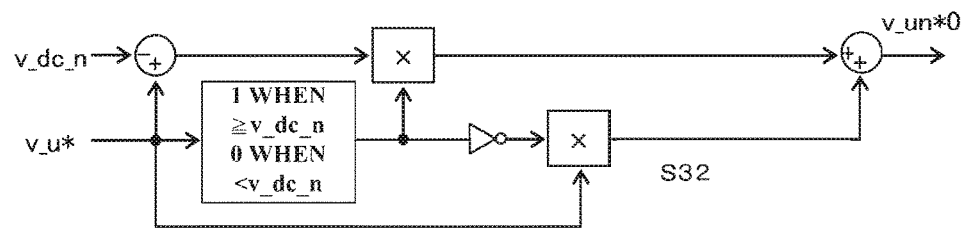

The calculation of those difference voltages is performed in accordance with the control block illustrated in FIG. 5. A U-phase upper-arm chopper cell group voltage command value v_up*0 is calculated as v_up*0=v_dc−v_u* when the AC voltage command value $v\_u^*$ is equal to or higher than the DC neutral voltage $v\_dc\_n$, and when the AC voltage command value $v\_u^*$ is smaller than the DC neutral voltage $v\_dc\_n$, such a command value is calculated as $v\_up^*0=v\_dc\_n-v\_u^*$ (S31).

A U-phase lower arm chopper cell group voltage command value $v\_un^*0$ is calculated as $v\_un^*0=v\_u^*-v\_dc\_n$ when the AC voltage command value $v\_u^*$ is equal to or higher than the DC neutral voltage $v\_dc\_n$, and is calculated as $v\_up^*0=v\_u^*$ when the AC voltage command value $v\_u^*$ is smaller than the DC neutral voltage $v\_dc\_n$ (S32).

Figure 6:
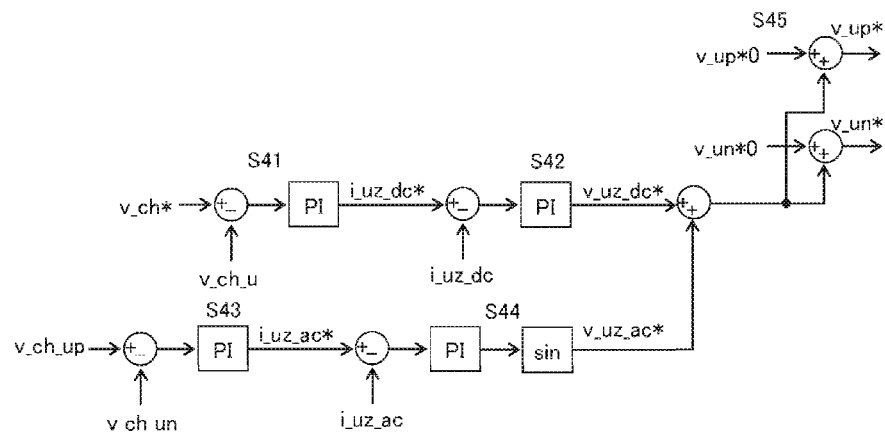
FIG. 6 is a control block diagram illustrating a control method on a capacitor voltage.

Next, an explanation will be given of a method of controlling a capacitor voltage with reference to FIG. 6 that is a control block diagram for the U-phase as an example.

An average value $v\_ch\_u$ of the U-phase chopper cell capacitor voltages in the chopper cell group circuits 15, 16 causes a DC circulating current $i\_uz\_dc$ to flow through a path that is through the DC positive terminal, the switching element 11, the chopper cell group circuit 15, the chopper cell group circuit 16, the switching element 13, and the DC neutral point when the output AC voltage is larger than the DC neutral voltage, and causes the DC circulating current $i\_uz\_dc$ to flow through a path that is through the DC neutral point, the switching element 12, the chopper cell group circuit 15, the chopper cell group circuit 16, the switching element 14, and the DC negative terminal when the output AC voltage is smaller than the DC neutral voltage, and thus the capacitor voltage is controlled to constant.

A command value $i\_uz\_dc^*$ for the DC circulating current is a value obtained by performing proportional integration on a value obtained by subtracting a U-phase chopper cell capacitor voltage average value $v\_ch\_u$ from a capacitor voltage command value $v\_ch^*$ (S41). A proportional integration is performed on a value obtained by subtracting the DC circulating current $i\_uz\_dc$ from the generated DC circulating current command value $i\_uz\_dc^*$, thereby generating a U-phase DC circulating voltage command value $v\_uz\_dc^*$ (S42). Note that the circulating current $i\_uz$ is contained in both the U-phase upper arm current $i\_up$ and the U-phase lower arm current $i\_un$, and a DC component of $(i\_up+i\_un)/2=i\_uz$ is extracted by, for example, filtering, thereby detecting $i\_uz\_dc$.

In order to equalize a capacitor voltage average value $v\_ch\_up$ in the chopper cell group circuit 15 and a capacitor voltage average value $v\_ch\_un$ in the chopper cell group circuit 16, when the output AC voltage is larger than the DC neutral voltage, an AC circulating current $i\_uz\_ac$ with the same frequency as that of the output AC voltage is caused to flow through a path that is through the DC positive terminal, the switching element 11, the chopper cell group circuit 15, the chopper cell group circuit 16, the switching element 13, and the DC neutral point. When the output AC voltage is smaller than the DC neutral voltage, the AC circulating current $i\_uz\_ac$ with the same frequency is caused to flow through a path that is through the DC neutral point, the switching element 12, the chopper cell group circuit 15, the chopper cell group circuit 16, the switching element 14, and the DC negative terminal.

An AC circulating current command value $i\_uz\_ac^*$ is set to be a value obtained by performing a proportional integration on the value obtained by subtracting the capacitor voltage average value $v\_ch\_up$ in the chopper cell group circuit from the capacitor voltage average value $v\_ch\_up$ in the chopper cell group circuit 15 (S43). A proportional integration is performed on the value obtained by subtracting the AC circulating current $i\_uz\_ac$ from the generated AC circulating current command value $i\_uz\_ac^*$, and the result is substituted in a sine function, thereby generating a U-phase AC circulating voltage command value $v\_uz\_ac^*$ (S44). Note that the DC circulating current $i\_uz\_dc$ is subtracted from the circulating current $i\_uz$, thereby detecting the AC circulating current $i\_uz\_ac$.

Those U-phase DC circulating voltage command value $v\_uz\_dc^*$ and U-phase AC circulating voltage command value $v\_uz\_ac^*$ are added to the U-phase upper arm voltage command value $v\_up^*0$ and the U-phase lower arm voltage command value $v\_un^*0$, respectively, and thus a U-phase upper arm voltage command value $v\_up^*$ and a U-phase lower arm voltage command value $v\_un^*$ are generated (S45).

Figure 7:
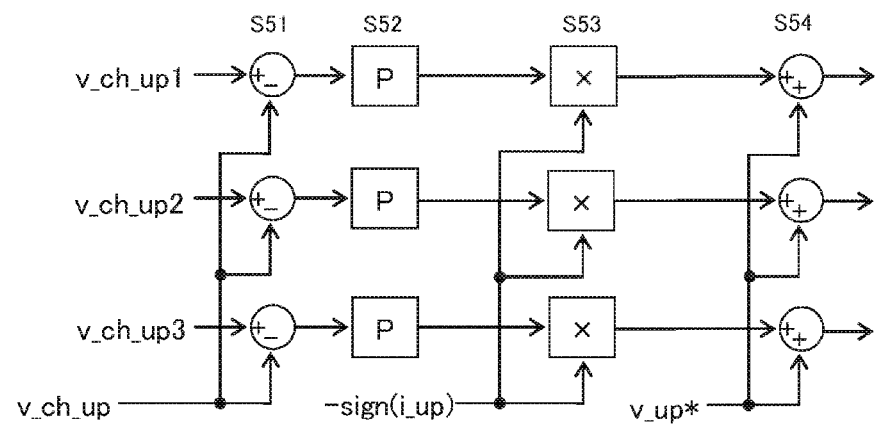
FIG. 7 is a control block diagram illustrating a method of equalizing capacitor voltages v_ch_up1-3 of chopper cells ch_up1-3.

Next, an explanation will be given of a method of equalizing the capacitor voltages $c\_ch\_up1$-$3$ of the chopper cells $ch\_up1$-$3$ in the chopper cell group circuit 15 with reference to FIG. 7 that is a control block diagram.

Output voltages $v\_up1$-$3$ by the chopper cells $ch\_up1$-$3$ are to be adjusted. When the U-phase upper arm current $i\_up$ is positive, the capacitors are charged, and thus a control is performed in such a way that the output voltage by the chopper cell that has a small capacitor voltage is increased, while the output voltage by the chopper cell that has a large capacitor voltage is reduced. In addition, when the U-phase upper arm current $i\_up$ is negative, the capacitors are discharged, and thus a control is performed in such a way that the output voltage by the chopper cell that has a small capacitor voltage is reduced, while the output voltage by the chopper cell that has a large capacitor voltage is increased. This will be explained for the chopper cell group circuit $ch\_up1$ as an example. The capacitor voltage average value $v\_ch\_up$ of the chopper cell group circuit $ch\_up$ is subtracted from a capacitor voltage $v\_ch\_up1$ (S51), the subtraction result is then multiplied by a proportional gain (S52), and the multiplication result is further multiplied by a value of the U-phase upper arm current $i\_up$ that has a sign $(1, -1)$ inverted (S53), and is added with the U-phase upper arm voltage command value $v\_up^*$ (S54).

Figure 8:
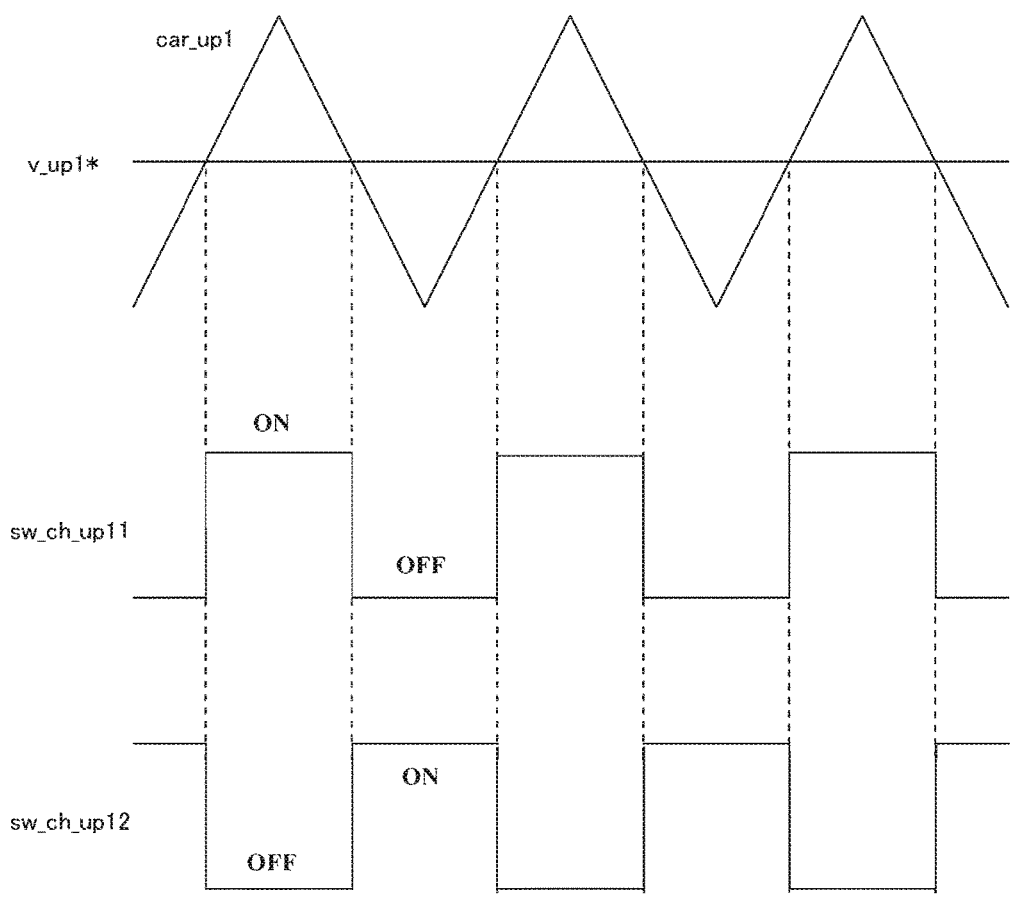
FIG. 8 is a graph for explaining a method of outputting a chopper cell voltage.

Next, a method of outputting a chopper cell voltage will be explained. Since the voltage outputting method is consistent across the whole chopper cells, the explanation will be given with reference to FIG. 8 for the chopper cell $ch\_up1$ as an example. Note that the switching elements that form the chopper cell $ch\_up1$ are $sw\_ch\_up11$ and $sw\_ch\_up12$.

In order to output an output voltage command value $v\_up1^*$ for the chopper cell $ch\_up1$, this output voltage command value is compared with a carrier triangular wave $car\_up1$, and when the carrier triangular wave $car\_up1$ is larger than the output voltage command value $v\_up1^*$, the switching element $sw\_ch\_up11$ is turned ON, while the switching element $sw\_ch\_up12$ is turned OFF. When the carrier triangular wave $car\_up1$ is smaller than the output voltage command value $v\_up1^*$, the switching element $sw\_ch\_up11$ is turned OFF, while the switching element $sw\_ch\_up12$ is turned ON.

When the chopper cell group circuit $ch\_up$ is formed by n number of chopper cells, by shifting the phase of the carrier triangular wave for each 360 degrees/n, an equivalent carrier frequency can be increased to n times as much as the frequency of the carrier triangular wave, and thus the harmonic voltage components in the output AC voltage can be reduced. In addition, by shifting the carrier triangular wave phase for the chopper cell group circuit $ch\_un$ by 180 degrees relative to the chopper cell group circuit $ch\_up$, the harmonic voltage components in the output AC voltage can be further reduced.

(Effect)

Figure 11:
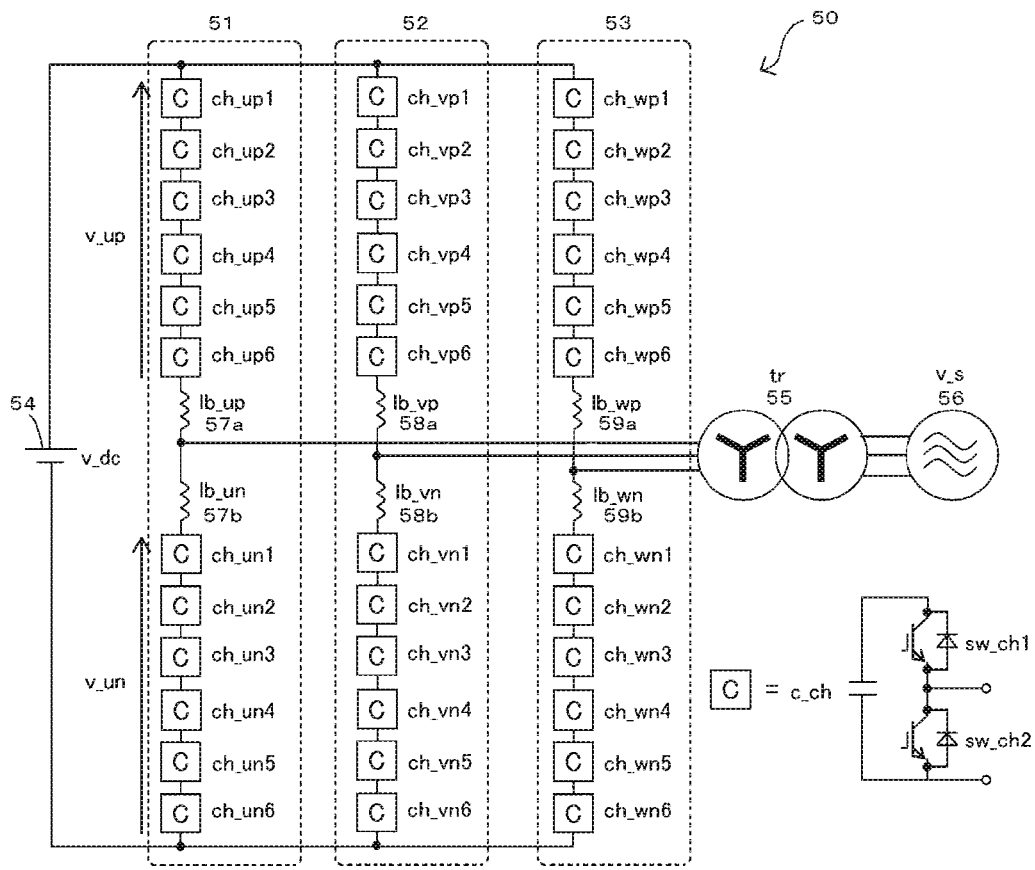
FIG. 11 is a circuit diagram illustrating an example MMC utilized for a conventional DC power transmission application.

(1) According to this embodiment, when a power converter is designed which has specifications for an input DC voltage, an output AC voltage, and an AC current like the conventional technologies, in comparison with the number of chopper cells according to the conventional technologies (in FIG. 11, 12 chopper cells), the number of chopper cells can be six, i.e., reduced to ½. That is, the number of capacitors, and that of switching elements that form the chopper cells can be ½. The number of capacitors simply becomes ½, and since the capacitors that are the major occupants in the power converter are reduced, this is remarkably advantageous to the dimension reduction. Although the number of switching elements applied to the chopper cells becomes ½, the number of switching elements 11-14 increases. However, the comprehensive number of applied switching elements largely depends on the number of chopper cells. Accordingly, the number of switching elements as a whole is remarkably reduced.

In addition, the switching elements that form the chopper cell perform switching at a high frequency (several hundred to several kHz), but since the number of elements always performing switching becomes ½, the switching loss is reduced, allowing a simplification of a cooling device.

(2) According to the conventional technologies, an AC current relative to the input DC voltage v_dc is always output. Hence, power supplied from the DC voltage v_dc takes a value obtained by integrating DC voltage v_dc× output AC current i_ac by a cycle of the AC voltage, and becomes zero. Hence, in order to supply power from the DC side to the AC side, it is necessary to cause a circulating current i_z equivalent to the output AC power to flow through the chopper cell group circuit. In contrast, according to this embodiment, while the output AC voltage v_ac is being positive, the output AC current i_ac is supplied from the positive DC voltage v_dc_p, and while the output AC voltage v_ac is being negative, the output AC current i_ac is supplied from the negative DC voltage v_dc_n. Hence, the output AC current contains effective power relative to the DC voltage. Accordingly, the DC circulating current flowing through the chopper cells becomes smaller than that of the conventional technologies, and thus the flowing current through the switching elements 11-14 and the switching elements forming the chopper cell group circuits 15, 16 becomes smaller than that of the conventional technologies. Accordingly, the conduction loss and the switching loss are reduced.

Like (1) and (2), because of the reduction of the number of capacitors, the reduction of losses, and the simplification of the cooling device, the costs of the power converter and the dimension thereof are remarkably improved. In addition, because of the reduction of losses, the power conversion efficiency improves, and thus the running costs decreases.

(3) By inserting the reactors 17a, 17b, and 17c in a path from the connection node between the switching element 12 and the switching element 13 to the DC neutral point, a current to be generated when the switching element 11 and the switching element 12, and, the switching element 13 and the switching element 14 are short-circuited is suppressed. Accordingly, a time at which a short-circuit protection function acts on is extended through a gate voltage control on the switching element, and thus the reliability of the power converter improves.

Second Embodiment

Structure

Figure 9:
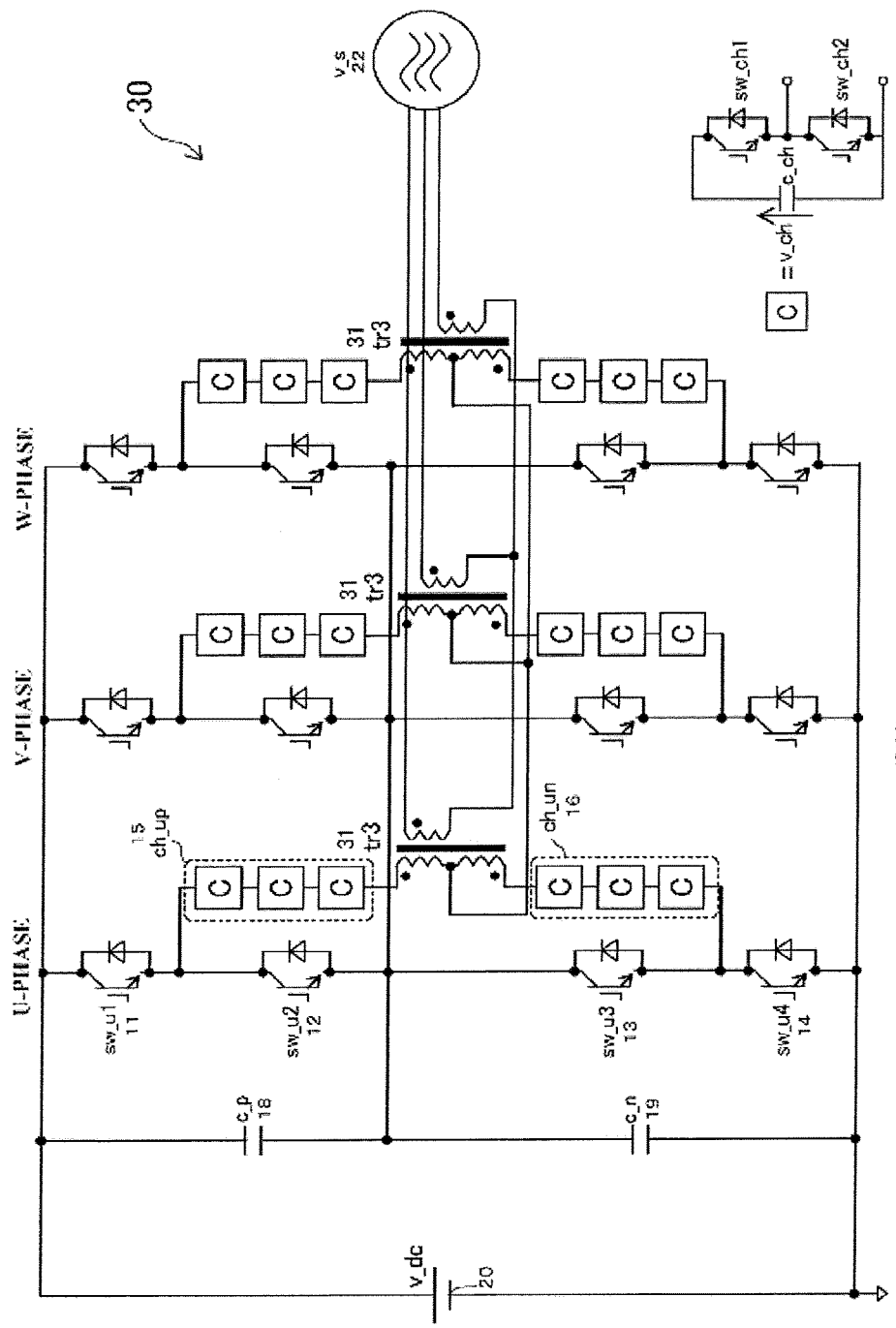
FIG. 9 is a circuit diagram illustrating a power converter according to a second embodiment of the present disclosure.

FIG. 9 is a circuit diagram illustrating a power converter 30 according to a second embodiment of the present disclosure. Note that the same structural component as that of the first embodiment will be denoted by the same reference numeral, and the duplicated explanation thereof will be omitted.

According to this power converter 30, the chopper cell group circuit 15 has a negative terminal connected to the primary positive terminal of a three-winding transformer (tr3), the chopper cell group circuit 16 has a positive terminal connected to the secondary positive terminal of the three-winding transformer 31, the three-winding transformer 31 has the primary negative terminal and the secondary negative terminal connected to the DC neutral point, and the three-winding transformer 31 has a tertiary side serving for the output AC voltage.

In addition, in the case of two-phase or three-phase structure, the primary negative terminal of the three-winding transformer 31 and the secondary negative terminal thereof are not connected to the DC neutral point, but may be connected to each other in each phase.

When the AC voltage output is converted through the transformer in this way, by applying the three-winding transformer, a function as a reactor is given to the leakage inductance of the transformer.

(Effect)

According to this embodiment, by connecting the three-winding transformer, a short-circuit suppressing function for the input DC voltage is given to the leakage inductance of the three-winding transformer. Hence, a placement of a reactor can be omitted, and thus the costs of the power converter and the dimension thereof can be reduced.

Other Embodiments (1) In the above first and second embodiments, two power converters employing the same structure and having a common DC voltage may be prepared, a node between the output AC terminals of the two power converters may be utilized for an AC voltage output, and the DC neutral voltage may be controlled to constant by a zero-phase voltage.

(2) In the above first and second embodiments, three power converters which employ the same structure and which have the common DC voltage may be provided, a node between the adjoining output AC terminals of the three power converters may be utilized as the three-phase AC voltage outputs, respectively, and the DC neutral voltage may be controlled to constant by the zero-phase voltage.

(3) In the above second embodiment, two power converters which have the common DC voltage, and which employ the same structure in which the primary negative terminal of the three-winding transformer and the secondary negative terminal thereof are not connected to the DC neutral point may be provided, a node between the adjoining output AC terminals of the two power converters may be taken as the AC voltage output, and the DC neutral voltage may be controlled to constant by the zero-phase voltage.

(4) In the above second embodiment, three power converters which have the common DC voltage, and which employ the same structure in which the primary negative terminal of the three-winding transformer and the secondary negative terminal thereof are not connected to the DC neutral point may be provided, the primary negative terminal of the three-winding transformer of each of the three power converters may be connected to the secondary negative terminal thereof, a node the adjoining output AC terminals of the three power converters may be taken as the AC voltage outputs, respectively, and the DC neutral voltage may be controlled to constant by the zero-phase voltage.

(5) Several embodiments of the present disclosure have been explained, but those embodiments are merely presented as examples, and are not intended to limit the scope of the present disclosure. Those embodiments can be carried out in other various forms, and various omissions, replacements, and modifications can be made thereto without departing from the scope of the present disclosure. Those embodiments and modified forms thereof are within the scope of the present disclosure, and are also within the scope of the subject matter as recited in the claims and the equivalent range thereto.

REFERENCE SIGNS LIST

1 Leg
2 Capacitor (c_ch)
3a Switching element (sw_ch1)
3b Switching element (sw_ch2)
10 Power converter
11 Switching element (sw_u1) (first switching element)
12 Switching element (sw_u2) (second switching element)
13 Switching element (sw_u3) (third switching element)
14 Switching element (sw_u4) (fourth switching element)
15 Chopper cell group circuit (ch_up) (first chopper cell group circuit)
16 Chopper cell group circuit (ch_un) (second chopper cell group circuit)
17a Reactor (lb_u)
17b Reactor (lb_v)
17c Reactor (lb_w)
18 Capacitor (c_p)
19 Capacitor (c_n)
20 DC power supply
21 Transformer (tr)
22 Power-system voltage (v_s)
30 Power converter
31 Three-winding transformer

The invention claimed is:

1. A power converter mutually converting power between AC and DC, the power converter comprising:
first, second, third, and fourth switching elements having self-extinguishing properties and connected in series to a DC power supply in an ascending order, a collector of the first switching element being connected to a DC positive terminal of the DC power supply, an emitter of the fourth switching element being connected to a DC negative terminal of the DC power supply;
first and second capacitors connected with each other in series and connected in parallel with the DC power supply, a DC neutral point divided by the first and second capacitors being connected to an emitter of the second switching element and a collector of the third switching element; and
first and second chopper cell group circuits each comprising one or more chopper cells connected in series that comprise a leg having two self-extinguishing type switching elements connected in series, and a capacitor connected to the leg in parallel therewith;
wherein:
the second switching element has a collector connected to one terminal of the first chopper cell group circuit;
the third switching element has an emitter connected to one terminal of the second chopper cell group circuit;
the first chopper cell group circuit has a negative terminal coupled to a positive terminal of the second chopper cell;
a three-winding transformer is provided to each phase;
the first chopper cell group circuit has other terminal connected to a primary positive terminal of a three-winding transformer;
the second chopper cell group circuit has other terminal connected to a secondary positive terminal of the three-winding transformer;
the three-winding transformer has a primary negative terminal and a secondary negative terminal connected with each other in each phase; and
a tertiary side of the three-winding transformer serves as an output AC voltage.

2. The power converter according to claim 1, wherein:
two of the power converters having a common DC voltage and employing a same structure are provided;
a node between the respective output AC terminals of the two power converters serves for an AC voltage output; and
a voltage of the DC neutral point is controlled to constant by a zero-phase voltage.

3. The power converter according to claim 1, wherein:
three of the power converters having a common DC voltage and employing a same structure are provided;
a node between the adjoining output AC terminals of the three power converters serves for a three-phase AC voltage output; and
a voltage of the DC neutral point is controlled to constant by a zero-phase voltage.

4. The power converter according to claim 1, wherein:
two of the power converters are provided, the two power converters having a common DC voltage, and employing a same structure in which the primary negative terminal of the three-winding transformer and the secondary negative terminal thereof are not connected to the DC neutral point;
a node between the respective output AC terminals of the two power converters serves for an AC voltage output; and
a voltage of the DC neutral point is controlled to constant by a zero-phase voltage.

5. The power converter according to claim 1, wherein:
three of the power converters are provided, the three power converters having a common DC voltage, and employing a same structure in which the primary negative terminal of the three-winding transformer and the secondary negative terminal thereof are not connected to the DC neutral point;
the primary negative terminal of the three-winding transformer in each of the three power converters is connected to the secondary negative terminal of the three-winding transformer in the other one of the three power converters;
a node between the adjoining output AC terminals of the three power converters serves as a three-phase AC voltage output; and
a voltage of the DC neutral point is controlled to constant by a zero-phase voltage.

6. The power converter according to claim 1, wherein:
when an output AC voltage is larger than a voltage of the DC neutral point, the first switching element and the third switching element are turned ON, the second switching element and the fourth switching element are turned OFF, the first chopper cell group circuit outputs a difference voltage between a DC positive voltage and the output AC voltage, and the second chopper cell group circuit outputs a difference voltage between the output AC voltage and the DC neutral point; and when the output AC voltage is smaller than the voltage of the DC neutral point, the first switching element and the third switching element are turned OFF, the second switching element and the fourth switching element are turned ON, the first chopper cell group circuit outputs a difference voltage between the DC neutral voltage and the output AC voltage, and the second chopper cell group circuit outputs a difference voltage between the output AC voltage and a DC negative voltage.

7. The power converter according to claim 6, wherein:

when the output AC voltage is larger than the DC neutral voltage, a DC circulating current is caused to flow through a path that is through the DC positive terminal, the first switching element, the first chopper cell group circuit, the second chopper cell group circuit, the third switching element, and the DC neutral point; and when the output AC voltage is smaller than the DC neutral voltage, the DC circulating current is caused to flow through a path that is through the DC neutral point, the second switching element, the first chopper cell group circuit, the second chopper cell group circuit, the fourth switching element, and the DC negative terminal, thereby controlling an average value of capacitor voltages in the first and second chopper cell group circuits to constant.

8. The power converter according to claim 6, wherein:

when the output AC voltage is larger than the DC neutral voltage, an AC circulating current is caused to flow through a path that is through the DC positive terminal, the first switching element, the first chopper cell group circuit, the second chopper cell group circuit, the third switching element, and the DC neutral point; and when the output AC voltage is smaller than the DC neutral voltage, the AC circulating current is caused to flow through a path that is through the DC neutral point, the second switching element, the first chopper cell group circuit, the second chopper cell group circuit, the fourth switching element, and the DC negative terminal, thereby equalizing an average value of a capacitor voltage in the first chopper cell group circuit and an average value of a capacitor voltage in the second chopper cell group circuit.

9. The power converter according to claim 6, wherein a plurality of capacitor voltages in the first chopper cell group circuit is controlled to a same value by adjusting an output voltage share by the plurality of chopper cells in the first chopper cell group circuit, and a plurality of capacitor voltages in the second chopper cell group circuit is controlled to a same value by adjusting an output voltage share by the plurality of chopper cells in the second chopper cell group circuit.

* * * * *